(12) United States Patent
Jayaraman et al.

(10) Patent No.: US 8,745,633 B2
(45) Date of Patent: Jun. 3, 2014

(54) SYSTEM AND METHOD FOR MANAGING RESOURCES IN A PARTITIONED COMPUTING SYSTEM BASED ON RESOURCE USAGE VOLATILITY

(75) Inventors: Bhaskar Jayaraman, Bangalore (IN); Brian D McKean, Longmont, CO (US)

(73) Assignee: LSI Corporation, Milpitas, CA (US)

( * ) Notice: Subject to any disclaimer, the term of this patent is extended or adjusted under 35 U.S.C. 154(b) by 636 days.

(21) Appl. No.: 12/777,276

(22) Filed: May 11, 2010

(65) Prior Publication Data

US 2011/0283289 A1 Nov. 17, 2011

(51) Int. Cl.
G06F 9/46 (2006.01)
G06F 9/455 (2006.01)
G06F 15/173 (2006.01)

(52) U.S. Cl.
USPC .............. 718/105; 718/1; 718/104; 709/223; 709/224; 709/226

(58) Field of Classification Search
USPC .................. 718/100, 104; 709/223, 224, 226
See application file for complete search history.

(56) References Cited

U.S. PATENT DOCUMENTS

| | | | |
|---|---|---|---|
| 7,685,283 B2 * | 3/2010 | Boyce et al. ................. 709/226 |
| 8,095,929 B1 * | 1/2012 | Ji et al. ............................... 718/1 |
| 8,255,907 B2 * | 8/2012 | Chiaramonte et al. ............ 718/1 |
| 8,364,460 B2 * | 1/2013 | Ostermeyer et al. ............ 703/22 |
| 8,661,131 B1 * | 2/2014 | Yemini et al. ................. 709/226 |
| 2004/0168170 A1 * | 8/2004 | Miller ........................... 718/104 |
| 2008/0168457 A1 * | 7/2008 | Accapadi et al. ............. 718/104 |
| 2008/0172672 A1 * | 7/2008 | Logan et al. .................. 718/104 |
| 2009/0007125 A1 * | 1/2009 | Barsness et al. .............. 718/104 |
| 2009/0217283 A1 * | 8/2009 | Anand et al. .................. 718/104 |
| 2009/0235265 A1 * | 9/2009 | Dawson et al. ................ 718/104 |
| 2009/0276783 A1 * | 11/2009 | Johnson et al. ............... 718/104 |
| 2011/0173329 A1 * | 7/2011 | Zhang et al. .................. 709/226 |
| 2011/0185062 A1 * | 7/2011 | Foege et al. ................... 709/226 |

* cited by examiner

*Primary Examiner* — Charles Swift
(74) *Attorney, Agent, or Firm* — Prakash Nama; Global IP Services, PLLC

(57) ABSTRACT

A system and method for managing resources in a partitioned computing system using determined risk of resource saturation is disclosed. In one example embodiment, the partitioned computing system includes one or more partitions. A volatility of resource usage for each partition is computed based on computed resource usage gains/losses associated with each partition. A current resource usage of each partition is then determined. Further, a risk of resource saturation is determined by comparing the computed volatility of resource usage with the determined current resource usage of each partition. The resources in the partitioned computing system are then managed using the determined risk of resource saturation associated with each partition.

12 Claims, 5 Drawing Sheets

| TIME 202 | MEMORY USAGE 204 | LN (VALUE AT X+Δ / VALUE AT X) 206 | CPU USAGE 208 | LN (VALUE AT X+Δ / VALUE AT X) 210 | I/OS PER SECOND 212 | LN (VALUE AT X+Δ / VALUE AT X) 214 |
|---|---|---|---|---|---|---|
| X | 28% | | 24.2% | | 28.25% | |
| X+Δ | 28.5% | 1.77% | 24.8 | 2.45% | 27.58% | -2.40% |
| X+2xΔ | 27% | -5.41% | 25.15 | 1.40% | 27.42% | -0.58% |
| X+3xΔ | 27.5% | 1.83% | 25.5 | 1.38% | 27.25% | -0.62% |
| X+4xΔ | 29% | 5.31% | 25.65 | 0.59% | 27.08% | -0.63% |
| X+5xΔ | 28% | -3.51% | 25.92 | 1.05% | 26.86% | -0.82% |
| MEAN | | -.002% | | 1.374% | | -1.01% |
| STDEV – VOLATILITY | | 3.90% | | 0.61% | | 0.69% |

SYSTEM AND METHOD FOR MANAGING RESOURCES IN A PARTITIONED COMPUTING SYSTEM BASED ON RESOURCE USAGE VOLATILITY

BACKGROUND

Typically, performance of a partitioned computing system including multiple partitions is measured in terms of usage of its resources, such as central processing unit (CPU), input/output (I/O), memory and the like. Peak usage of a partitioned computing system's resources in a datacenter usually happens at different times and many times they can be random and unpredictable. An increase or decrease in the usage of a partitioned computing system's resource can affect its performance and needs to be managed reliably for performance improvements, i.e., hardware resources of the partitioned computing system need to be managed to improve performance.

Very often, this assured reliability and management of resources on the partitioned computing system are governed by service level agreements (SLAs). For example, a user may assign the resources to one or more partitions based on SLAs, which may not require all of the assigned resources to run the applications. This can result in underutilizing the assigned resources and can also result in risk of resource utilization being low. In contrast, the user can assign less than required resources to the one or more partitions in the partitioned computing system, which can result in risk of resource utilization being high and can significantly affect performance.

SUMMARY

This summary is provided to comply with 37 C.F.R. §1.73, requiring a summary of the invention briefly indicating the nature and substance of the invention. It is submitted with the understanding that it will not be used to interpret or limit the scope or meaning of the claims.

A system and method for managing resources in a partitioned computing system based on resource usage volatility is disclosed. In one aspect, in a computer implemented method for managing resources in a partitioned computing system based on resource usage volatility, where the partitioned computing system includes one or more partitions, a volatility of resource usage for each partition is computed based on computed resource usage gains/losses associated with each partition. A current resource usage of each partition is also determined. A risk of resource saturation is then determined by comparing the computed volatility of resource usage with the determined current resource usage of each partition. Further, resources in the partitioned computing system are managed using the determined risk of resource saturation associated with each partition.

In another aspect, a non-transitory computer-readable storage medium for managing resources in a partitioned computing system based on resource usage volatility has instructions that, when executed by a computing device, cause the computing device to perform a method as described above.

In yet another aspect, a system includes a partitioned computing system including one or more partitions, a network, a display device, and a partitioned computing system resource manager. The partitioned computing system resource manager is coupled to the partitioned computing system via the network and includes a display module. The partitioned computing system resource manager computes a volatility of resource usage for each partition based on computed resource usage gains/losses associated with each partition. The partitioned computing system resource manager then determines a current usage of each partition.

Further, the partitioned computing system resource manager determines a risk of resource saturation by comparing the computed volatility of resource usage with the determined current resource usage of each partition. The display module of the partitioned computing system resource manager displays the determined risk of resource saturation for each partition that can be used by a user to manage resources in the partitioned computing system.

Other features of the embodiments will be apparent from the accompanying drawings and from the detailed description that follows.

BRIEF DESCRIPTION OF THE DRAWINGS

Various embodiments are described herein with reference to the drawings, wherein:

FIG. 2 illustrates a table, in the context of the invention, including a typical statistical usage pattern of the partitioned computing system's resources.

The drawings described herein are for illustration purposes only and are not intended to limit the scope of the present disclosure in any way.

DETAILED DESCRIPTION

A system and method for managing resources in a partitioned computing system based on resource usage volatility is disclosed. In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined by the appended claims.

In the document, a partitioned computing system refers to a logical partitioned system or a virtual machine under a hypervisor or emulator.

Figure 1:
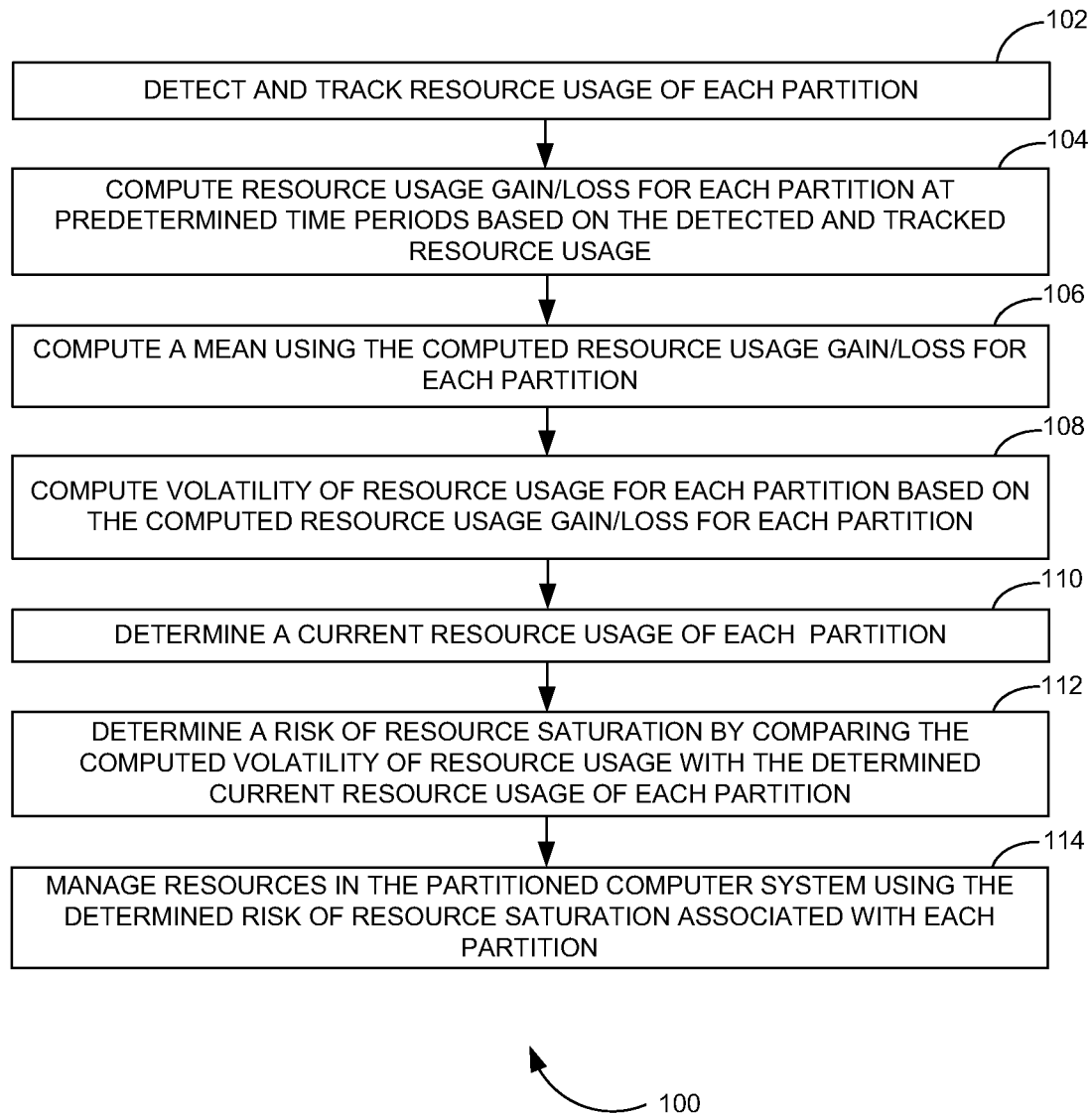
FIG. 1 illustrates a computer implemented flow diagram of an exemplary method for managing a partitioned computing system's resources based on resource usage volatility, according to one embodiment.

FIG. 1 illustrates a computer implemented flow diagram of an exemplary method 100 for managing a partitioned computing system's resources based on resource usage volatility, according to one embodiment. The partitioned computing system includes one or more partitions where each partition includes resources such as at least one CPU, at least one memory and at least one I/O. At step 102, resource usage of each partition is detected and tracked. For example, data associated with resource usage are collected at predetermined time periods and are entered in a table (e.g., the table 200 of FIG. 2). The predetermined time periods may range from a smallest unit of time that a clock on the each partition can provide to the maximum unit that a user (e.g., a system administrator) wishes to consider.

At step 104, resource usage gain/loss for each partition is computed at predetermined time periods based on the detected and tracked resource usage. At step 106, a mean is computed using the computed resource usage gain/loss for each partition at predetermined time periods. At step 108, the volatility of resource usage for each partition is computed based on the computed resource usage gain/loss. It should be noted that the computed resource usage gain/loss, the computed mean, and the computed volatility of resource usage associated with each partition are recorded in the table to analyze a typical statistical usage pattern of the partitioned computing system's resources.

At step 110, a current resource usage of each partition is determined. At step 112, a risk of resource saturation is determined by comparing the computed volatility of resource usage with the determined current resource usage of each partition. According to an embodiment of the present invention, the computed volatility of resource usage, the current resource usage and the determined risk of resource saturation are entered in a table (e.g., the table 302 of FIG. 3) and may be displayed to the user in a GUI. AT step 114, resources in the partitioned computing system are managed using the determined risk of resource saturation associated with each partition. For example, the user may analyze the table in the GUI and manage the partitioned computing system's resources depending on application requirements.

FIG. 2 illustrates a table 200, in the context of the invention, including a typical statistical usage pattern of the partitioned computing system's resources. Particularly, the table 200 includes the resource usage gain/loss computed at predetermined time periods, the computed mean and the computed volatility of resource usage associated with each partition. In one embodiment, by analyzing the statistical usage pattern from the table 200, a risk of resource saturation is determined and accordingly the user may manage the partitioned computing system's resources.

As shown, the table 200 includes a time field 202, a memory usage field 204, a natural logarithm (LN) field 206 associated with memory usage, a CPU usage field 208, a LN field 210 associated with CPU usage, an I/O per second field 212 and a LN field 214 associated with the I/Os per second. It can be seen from the table 200 that, the predetermined time periods are of equal intervals such as X, X+Δ, X+2Δ, X+3Δ, X+4Δ and X+5Δ. The resources usage gain/loss associated with the memory, the CPU and the I/Os per second over the predetermined time periods are entered in the memory usage field 204, the CPU usage field 208 and the I/Os per second field 212 respectively. The resource usage gain/loss is computed by detecting and tracking resource usage in each partition.

Further, LN of the resource usage gain/loss associated with the memory, the CPU and the I/Os per second over the predetermined time periods are entered in the LN field 206, the LN field 210 and the LN field 214 respectively. For example, the LN is calculated for a value at X+Δ/value at X. The table 200 also includes a mean which is computed using the resource usage gain/loss associated with the memory, the CPU and the I/Os per second. Further, standard deviations of the resource usage gain/loss associated with the memory, the CPU and the I/Os per second are computed and are entered in the table 200 as shown.

In one embodiment, the calculated standard deviation corresponds to the volatility of resource usage in the partition. For example, the volatility is a measure of a degree of variability of usage of each resource in the partition and determines a likelihood of resource saturation. The standard deviation may be calculated based on short term or long term historical data, or a combination. A low standard deviation indicates that all data points are very close to the mean value, while a high standard deviation indicates that the data points are "spread out" over a large range of values. Based on user needs, the value of standard deviation could either slide to a next set of values or the standard deviation may be computed cumulatively.

As shown in the table 200, the standard deviation associated with memory usage is 3.90%, with CPU usage is 0.61% and with I/O usage is 0.69%. It should be noted that, the resource having standard deviation tending to zero is the most stable resource and hence less volatile while the resource having standard deviation not tending to zero is the most unstable resource and hence volatile.

Figure 3:
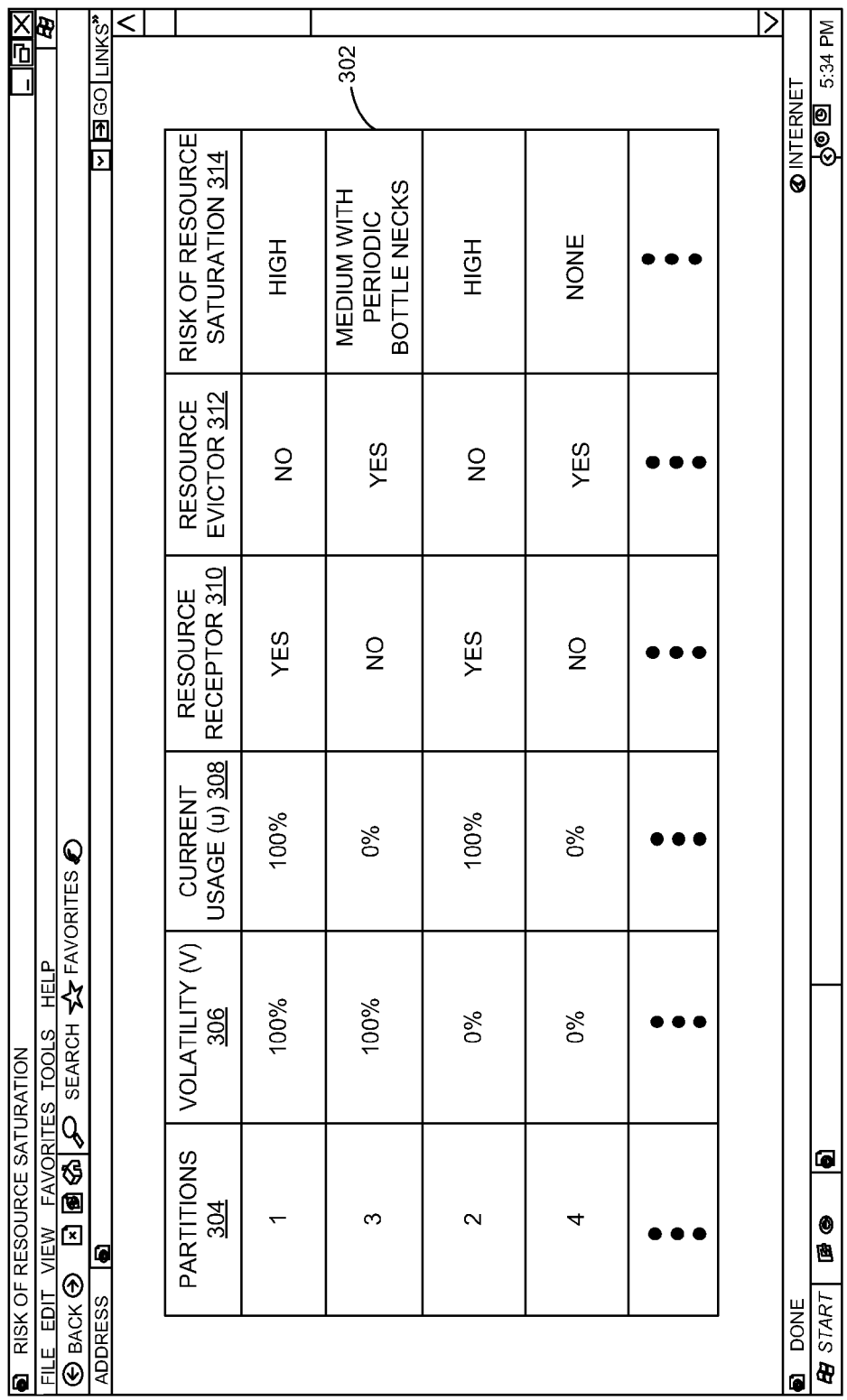
FIG. 3 illustrates a graphical user interface (GUI) including a table that can be used in managing the partitioned computing system's resources.

FIG. 3 illustrates a GUI 300 including a table 302 that can be used in managing the partitioned computing system's resources, according to one embodiment. Particularly, the GUI 300 enables the user to select a partition for moving in, moving out or sharing resources. As illustrated, the table 302 includes a partitions field 304, a volatility field 306, a current usage field 308, a resource receptor field 310, a resource evictor field 312 and a risk of resource saturation field 314.

The volatility field 306 displays volatility of resource usage in the partitions which corresponds to the computed standard deviations. The current usage field 308 displays a current resource usage of the partitions. The resource receptor field 310 displays whether or not the partitions are resource receptors. The resource evictor field 312 whether or not the partitions are resource evictors. The risk of resource saturation field 314 displays a risk of resource saturation in the partition based on the volatility of resource usage and the current resource usage.

As shown in the table 302, volatility associated with a partition 1 is 100% and current resource usage in the partition 1 is also 100%. Accordingly, the partition 1 is a resource receptor. Hence, the risk of resource saturation associated with the partition 1 is high. The volatility associated with a partition 3 is 100% and current resource usage in the partition 3 is 0%. Accordingly, the partition 3 is a resource evictor and the risk of resource saturation associated with the partition 3 is medium with periodic bottlenecks, i.e., it may not take any resource but it can give resources to one or more partitions.

Further, as shown in the table 302, volatility associated with a partition 2 is 0% and current resource usage in the partition 2 is 100%. Accordingly, the partition 2 is a resource receptor and the risk of resource saturation associated with the partition 2 is high. Also, as show in the table 302, volatility associated with a partition 4 is 0% and current resource usage in the partition 4 is 0%. The partition 4 is a resource evictor and hence there is no risk of resource saturation associated with the partition 4.

The user may analyze the table 302 in the GUI 300 and manages the partitioned computing system's resources. For example, the user may move in new resources, move out the resources, or share the resources in the partitioned computing system. The user may also consider application requirements during managing the resources. In one embodiment, the managing of the partitioned computing system's resources is automated.

Figure 4:
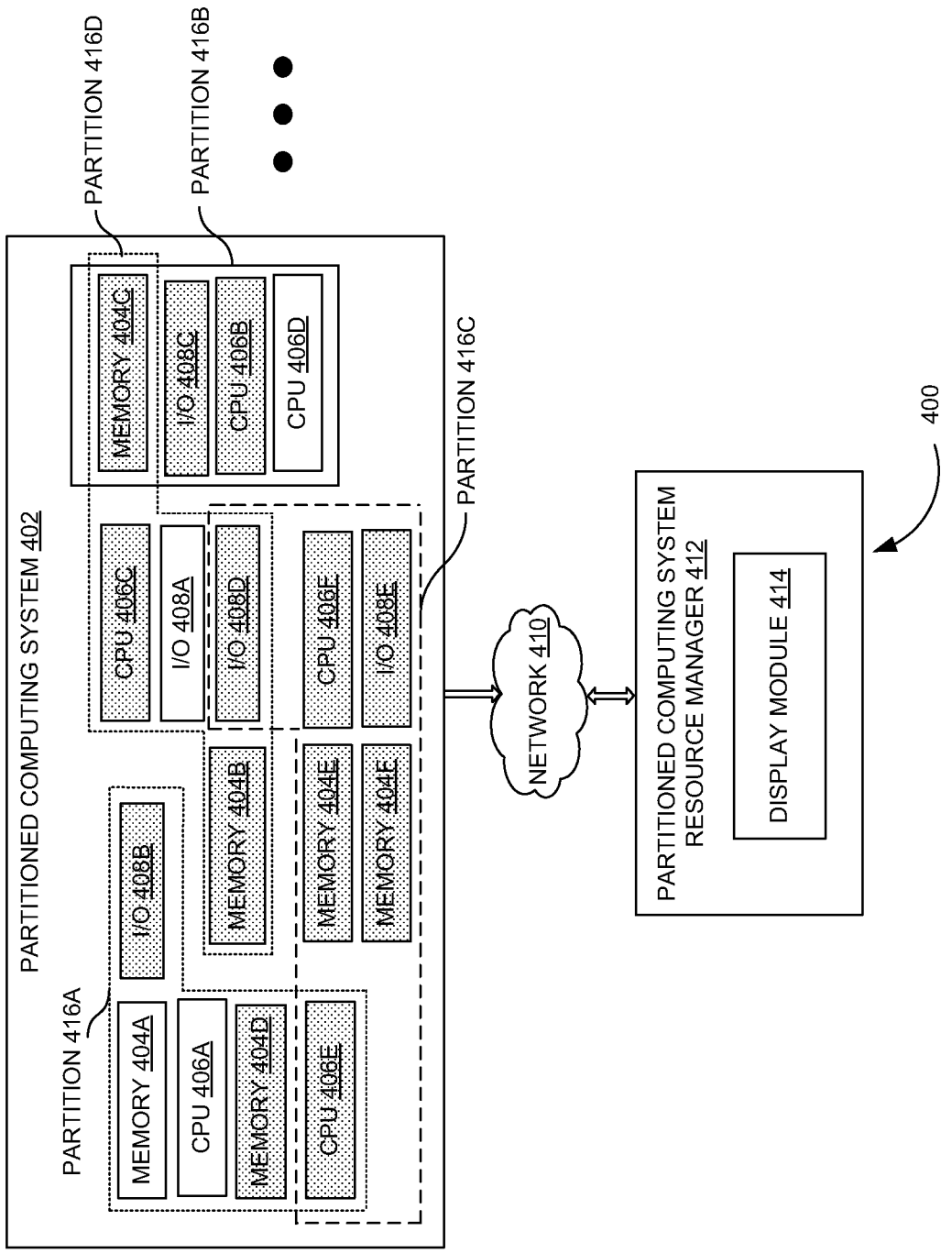
FIG. 4 illustrates a block diagram of a system for managing the partitioned computing system's resources based on the resource usage volatility, according to one embodiment.

FIG. 4 illustrates a block diagram 400 of a system for managing the partitioned computing system's resources based on the resource usage volatility, according to one embodiment. The system may include one or more partitioned computing systems. As shown in FIG. 4, a partitioned computing system 402 includes partitions 416A-D. The resources such as memory, CPUs and I/Os are distributed among the partitions 416A-D. It should be noted that, each of the partitions 416A-D may be allocated one or more memory 404A-F, one or more CPUs 406A-F and one or more I/Os 408A-E. Also, the partitions 416A-D may share the resources in the partitioned computing system 402.

As illustrated, the partition 416A includes resources such as memory 404A and 404D, CPUs 406A and 406E, and I/O 408B. The partition 416B includes resources such as memory 404C, CPUs 406B and 406D, and I/O 408C. It can be noted that, the memory 404C is shared by the partition 416B and 416D. The partition 416C includes resources such as memory 404E and 404F, I/Os 408D and 408E, and the CPUs 406E and 406F. It can be noted that, the CPU 406E is shared by the partition 416C and the partition 416A. The partition 416D includes resources such as memory 404B and 404C, CPU 406C and I/Os 408A and 408D. It can be noted that, the I/O 408D is shared by the partition 416D and 416C.

It can be seen from FIG. 4 that, the partitioned computing system 402 is coupled to a partitioned computing system resource manager 412 via a network 410. The partitioned computing system resource manager 412 monitors, analyzes and manages usage of the partitions 416A-D based on resource usage such as the memory 404A-F, the CPUs 406A-F and the I/Os 408A-E. According to an embodiment of the present invention, the partitioned computing system resource manager 412 analyzes statistical usage pattern of the partitions 416A-D and determines a risk of resource saturation. For example, the statistical usage pattern is analyzed using the table 200 that includes the resource usage gain/loss computed at predetermined time periods, the computed mean and the computed volatility of the resource usage associated with each of the partitions 416A-N.

The partitioned computing system resource manager 412 includes a display module 414 for displaying results of analysis of the statistical usage pattern to the user. Based on the displayed results, the user may decide whether to assign new resources to the partitions 416A-D, to move out any resources from the partitions 416A-D or to share the resources among the partitions 416A-D. For example, the displayed results include the computed volatility of resource usage, the current resource usage and the determined risk of resource saturation, as shown in the table 302. As shown in FIG. 4, the resources in the partition 416C are fully used and the risk of resource saturation is high. The resources such as the memory 404A and the CPU 406A in the partition 416A are unused. Accordingly, the partition 416C is a resource receptor and the partition 416A is a resource evictor.

Figure 5:
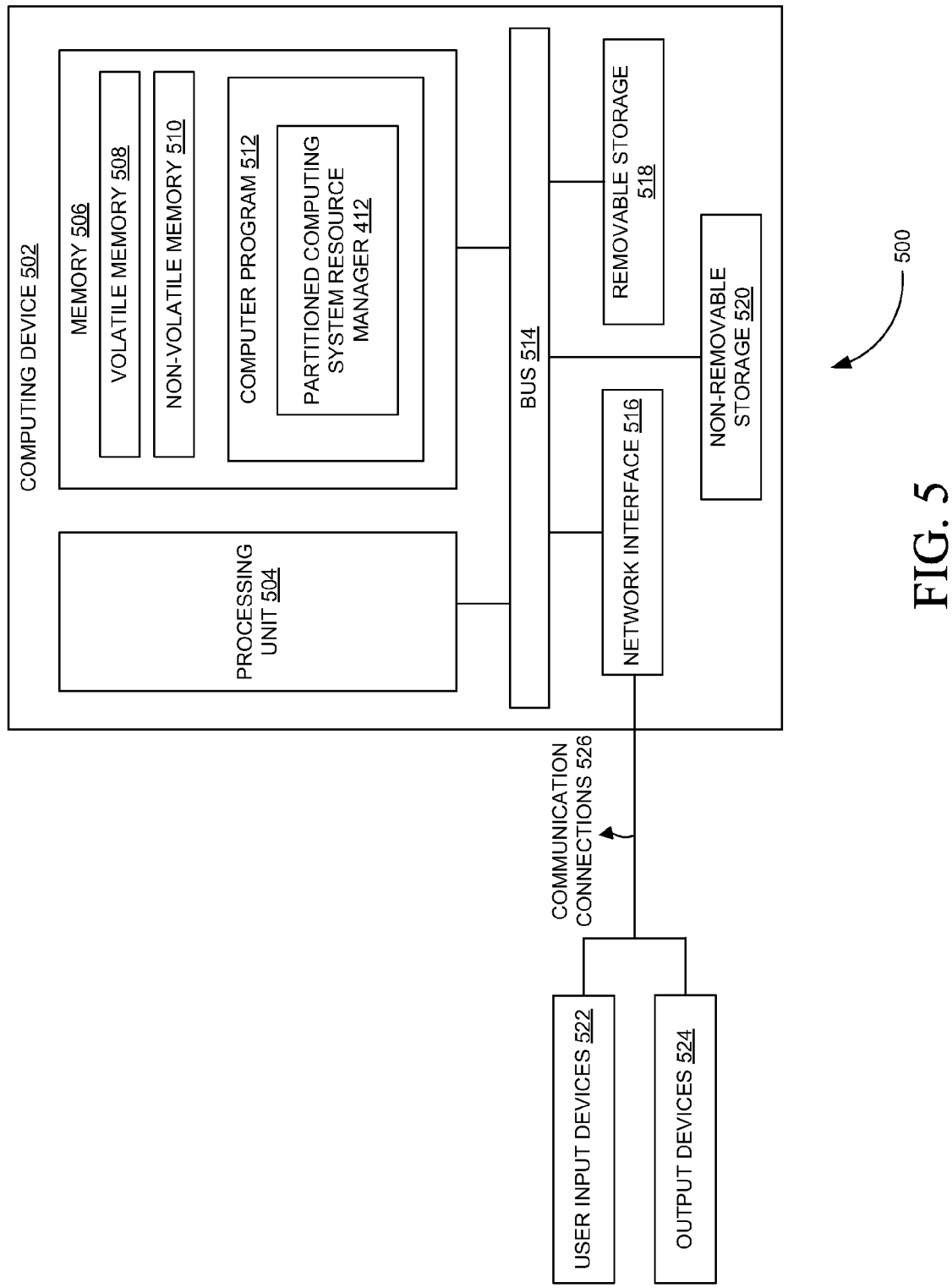
FIG. 5 illustrates an example of a suitable computing system environment for implementing embodiments of the present subject matter.

FIG. 5 shows an example of a suitable computing system environment 500 for implementing embodiments of the present subject matter. FIG. 5 and the following discussion are intended to provide a brief, general description of a suitable computing environment in which certain embodiments of the inventive concepts contained herein may be implemented.

A general computing device 502, in the form of a personal computer or a mobile device may include a processing unit 504, memory 506, a removable storage 518, and a non-removable storage 520. The computing device 502 additionally includes a bus 514 and a network interface 516. The computing device 502 may include or have access to the computing system environment 500 that includes one or more user input devices 522, one or more output devices 524, and one or more communication connections 526 such as a network interface card or a universal serial bus connection.

The one or more user input devices 522 may be a digitizer screen and a stylus, trackball, keyboard, keypad, mouse, and the like. The one or more output devices 524 may be a display device of the personal computer or the mobile device. The communication connections 526 may include a local area network, a wide area network, and/or other networks.

The memory 506 may include volatile memory 508 and non-volatile memory 510. A variety of computer-readable storage media may be stored in and accessed from the memory elements of the computing device 502, such as the volatile memory 508 and the non-volatile memory 510, the removable storage 518 and the non-removable storage 520. Computer memory elements may include any suitable memory device(s) for storing data and machine-readable instructions, such as read only memory, random access memory, erasable programmable read only memory, electrically erasable programmable read only memory, hard drive, removable media drive for handling compact disks, digital video disks, diskettes, magnetic tape cartridges, memory cards, Memory Sticks™, and the like.

The processing unit 504, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processing unit 504 may also include embedded controllers, such as generic or programmable logic devices or arrays, application specific integrated circuits, single-chip computers, smart cards, and the like.

Embodiments of the present subject matter may be implemented in conjunction with program modules, including functions, procedures, data structures, and application programs, for performing tasks, or defining abstract data types or low-level hardware contexts. Machine-readable instructions stored on any of the above-mentioned storage media may be executable by the processing unit 504 of the computing device 502. For example, a computer program 512 may include machine-readable instructions capable of managing resources in a partitioned computing system based on resource usage volatility, according to the teachings and herein described embodiments of the present subject matter. In one embodiment, the computer program 512 may be included on a compact disk-read only memory (CD-ROM) and loaded from the CD-ROM to a hard drive in the non-volatile memory 510. The machine-readable instructions may cause the computing device 502 to encode according to the various embodiments of the present subject matter.

As shown, the computer program 512 includes the partitioned computing system resource manager 412. For example, the partitioned computing system resource manager 412 may be in the form of instructions stored on a non-transitory computer-readable storage medium. The non-transitory computer-readable storage medium having the instructions that, when executed by the computing device 502, may cause the computing device 502 to perform the one or more methods described in FIGS. 1 through 5.

In various embodiments, the systems and methods described in FIGS. 1 through 5 may enable a user to choose a partition in the partitioned computing system to move in or move out resources based on the statistical usage pattern analysis. The above-described systems and methods ensure that an increase or decrease in usage of resource(s) in the partitioned computing system is reliably handled without affecting applications already running on the partitioned computing system. The above-described systems and methods also avoid any violation of SLAs in the partitioned computing system. The above-described systems and methods are also applicable to storage systems, storage networks, individual disk drives and the like.

Although the present embodiments have been described with reference to specific example embodiments, it will be evident that various modifications and changes may be made to these embodiments without departing from the broader spirit and scope of the various embodiments. Furthermore, the various devices, modules, analyzers, generators, and the like described herein may be enabled and operated using hardware circuitry, for example, complementary metal oxide semiconductor based logic circuitry, firmware, software and/or any combination of hardware, firmware, and/or software embodied in a machine readable medium. For example, the various electrical structure and methods may be embodied using transistors, logic gates, and electrical circuits, such as application specific integrated circuit.

What is claimed is:

1. A computer implemented method for managing resources in a partitioned computing system based on resource usage volatility, wherein the partitioned computing system includes one or more partitions, comprising:
   computing resource usage gain/loss for each partition at predetermined time periods based on resource usage of each partition;
   computing a volatility of resource usage for each partition based on the computed resource usage gains/losses associated with each partition, wherein the volatility of resource usage for each partition corresponds to a standard deviation of the computed resource usage gains/losses associated with each partition;
   determining a current resource usage of each partition;
   determining a risk of resource saturation by comparing the computed volatility of resource usage with the determined current resource usage of each partition; and
   managing resources in the partitioned computing system using the determined risk of resource saturation associated with each partition.

2. The method of claim 1, wherein computing the volatility of resource usage for each partition based on the computed resource usage gains/losses associated with each partition comprises:
   computing a mean using the computed resource usage gain/loss for each partition at the predetermined time periods; and
   computing the volatility of resource usage for each partition based on the computed mean.

3. The method of claim 1, wherein computing the resource usage gain/loss for each partition at predetermined time periods comprises:
   detecting and tracking the resource usage of each partition at the predetermined time periods; and
   computing the resource usage gain/loss for each partition at the predetermined time periods based on the detected and tracked resource usage.

4. The method of claim 1, wherein the resources are selected from the group consisting of CPU, I/O and memory.

5. A non-transitory computer-readable storage medium for managing resources in a partitioned computing system based on resource usage volatility having instructions that, when executed by a computing device, cause the computing device to perform a method comprising:
   computing resource usage gain/loss for each partition at predetermined time periods based on resource usage of each partition;
   computing a volatility of resource usage for each partition based on the computed resource usage gains/losses associated with each partition, wherein the volatility of resource usage for each partition corresponds to a standard deviation of the computed resource usage gains/losses associated with each partition;
   determining a current resource usage of each partition;
   determining a risk of resource saturation by comparing the computed volatility of resource usage with the determined current resource usage of each partition; and
   managing resources in the partitioned computing system using the determined risk of resource saturation associated with each partition.

6. The non-transitory computer-readable storage medium of claim 5, wherein computing the volatility of resource usage for each partition based on the computed resource usage gains/losses associated with each partition comprises:
   computing a mean using the computed resource usage gain/loss for each partition at the predetermined time periods; and
   computing the volatility of resource usage for each partition based on the computed mean.

7. The non-transitory computer-readable storage medium of claim 5, wherein computing the resource usage gain/loss for each partition at predetermined time periods comprises:
   detecting and tracking the resource usage of each partition at the predetermined time periods; and
   computing the resource usage gain/loss for each partition at the predetermined time periods based on the detected and tracked resource usage.

8. The non-transitory computer-readable storage medium of claim 5, wherein the resources are selected from the group consisting of CPU, I/O and memory.

9. A system, comprising:
   a partitioned computing system including one or more partitions;
   a network;
   a display device; and
   a partitioned computing system resource manager coupled to the partitioned computing system via the network, wherein the partitioned computing system resource manager includes a display module, wherein the partitioned computing system resource manager computes resource usage gain/loss for each partition at predetermined time periods; wherein the partitioned computing system resource manager computes a volatility of resource usage for each partition based on the computed resource usage gains/losses associated with each partition, wherein the volatility of resource usage for each partition corresponds to a standard deviation of the computed resource usage gains/losses associated with each partition, wherein the partitioned computing system resource manager determines a current resource usage of each partition, wherein the partitioned computing system resource manager determines a risk of resource saturation by comparing the computed volatility of resource usage with the determined current resource usage of each partition, and wherein the display module of the partitioned computing system resource manager displays the determined risk of resource saturation for each partition that can be used by a user to manage resources in the partitioned computing system.

10. The system of claim 9, wherein the partitioned computing system resource manager, in computing the volatility of resource usage for each partition based on the computed resource usage gains/losses associated with each partition, computes a mean using the computed resource usage gain/ loss for each partition at the predetermined time periods, and computes the volatility of resource usage for each partition based on the computed mean.

11. The system of claim 9, wherein the partitioned computing system resource manager, in computing the resource usage gain/loss for each partition at predetermined time periods, detects and tracks the resource usage of each partition at the predetermined time periods, and computes the resource usage gain/loss for each partition at the predetermined time periods based on the detected and tracked resource usage.

12. The system of claim 9, wherein the partitioned computing system resource manager manages resources selected from the group consisting of CPU, I/O and memory in the partitioned computing system.

* * * * *